United States Patent [19]
Koser et al.

[11] Patent Number: 5,799,189
[45] Date of Patent: Aug. 25, 1998

[54] COMPUTER SYSTEM WITH DOWNWARD COMPATIBILITY FUNCTION

[75] Inventors: Leonard William Koser, Oronoco; Mary Christine Manges, Rochester; Frances Mary Ring, Rochester; Cynthia Ann Rogers, Rochester; Michael John Snyder, Rochester; John Joseph Vriezen, Rochester, all of Minn.

[73] Assignee: International Business Machines Corporation, Armonk, N.Y.

[21] Appl. No.: 95,033

[22] Filed: Jul. 20, 1993

Related U.S. Application Data

[63] Continuation of Ser. No. 401,210, Aug. 31, 1989, abandoned.

[51] Int. Cl.$^6$ ............................................. G06F 5/00
[52] U.S. Cl. ............................................. 395/680
[58] Field of Search .............................. 395/500, 882, 395/680

[56] References Cited

U.S. PATENT DOCUMENTS

| | | | |
|---|---|---|---|
| 4,498,142 | 2/1985 | Advani et al. | 364/900 |
| 4,558,413 | 12/1985 | Schmidt et al. | 364/200 |
| 4,627,019 | 12/1986 | Ng | 364/900 |
| 4,788,637 | 11/1988 | Tamaru | 364/200 |
| 4,809,170 | 2/1989 | Leblang et al. | 364/200 |
| 4,875,159 | 10/1989 | Cary et al. | 364/200 |
| 4,947,366 | 8/1990 | Johnson | 395/275 |

OTHER PUBLICATIONS

IBM AS/400 System to System/38 Record Copy Facility PRPQ Specifications Oct., 1988.

Upward and Downward Compatibility Between Non–Compatible Profiles—IBM Technical Disclosure Bulletin vol. 28 No. 9 2/86 p. 4073.

Expanded Control Information Recorded in Nondestructive Memory During Coexistence of Multiple Releases of a Product —IBM Technical Disclosure Bulletin vol. 24 No. 7A 12/81 pp. 3204–3206.

Management of Programming Compatibility within a System of Separate Dependent Elements —IBM Technical Disclosure Bulletin vol. 31 No. 8 1/89 pp. 317–320.

Improved Buffering for Printer Device Driver—IBM Technical Disclosure Bulletin vol. 28 No. 11 4/86 p. 5068.

Primary Examiner—David Y. Eng
Attorney, Agent, or Firm—Andrew J. Dillon

[57] ABSTRACT

A method and apparatus is disclosed for moving a unit of data (such as an object, program, or file) from a computer operating at a current release level N to a computer operating at a previous release level N–M in a manner that assures that the unit of data will function predictably when restored to the previous release without having to make modifications or updates to the N–M level computer system. This invention allows a new release to be gradually phased in for a distributed computing system instead of requiring that all computers be upgraded to the new release before any units of data can be moved between systems.

11 Claims, 7 Drawing Sheets

COMPUTER SYSTEM WITH DOWNWARD COMPATIBILITY FUNCTION

This is a continuation of application Ser. No. 07/401,210, filed Aug. 31, 1989 now abandoned.

FIELD OF THE INVENTION

This invention relates to the data processing field. More particularly, this invention allows a unit of data from a computer running at release level N to operate on another computer running at release level N−M.

BACKGROUND OF THE INVENTION

Computer systems today have become much more distributed than they were in the past. Where before a company might have had one large computer, many companies today have several computers which are hooked together in a network or operate independently from each other. For a distributed, computing environment to be truly effective, there needs to be a mechanism for moving data between the computers in the computer system. Moving data is normally not a problem if all the computers in the distributed computing system are operating at the same release level. But a problem exists when a computer manufacturer or software developer provides a new release of the operating system or an application program. Installing a new release of the operating system or an application program is often a very time consuming process. Since this installation process must be repeated for each computer in the distributed computing system, it can often take several days or even months before all the computers in the distributed computing system are again operating at the same release level. It is unreasonable to expect all computers in a distributed computer system to be simultaneously upgraded. In addition, there may be instances where some computers in the distributed computing system are intentionally not upgraded every time a new release is introduced. Therefore, a distributed computing system often contains computers operating at different release levels, and an effective mechanism for moving data between these computers is needed.

Several successful attempts have been made to provide a mechanism for allowing a downlevel computer (operating at release level N−1) to send data, such as programs, files, or objects (hereinafter referred to as a "unit of data") to all uplevel computer (operating at release level N). These attempts usually "backup" the unit of data on the release N−1. computer on external media, such as a tape or diskette, and send the external media to the release N computer. (The release N computer performs a "restore" operation on the unit of data. This restore operation determines if any modifications need to be made to the unit of data to allow it to operate on an uplevel computer system. This determination is normally fairly easy to do, since the uplevel computer system usually has knowledge of what changes were made between releases. Effectively, the uplevel system looks into the past to make this determination.

Although sending units of data from a downlevel computer system to an uplevel computer system is fairly easy to do, sending units of data from an uplevel computer system to a downlevel computer system is considerably more complicated. If a "backup" operation is made on a unit of data on a release N system on external media that is sent to a release N−1 system, the release N−1 system cannot determine how to modify this unit of data to allow it to operate by doing a "restore" operation. The downlevel computer system has no knowledge of what changes were made between releases, and has no ability to look into the future to make this determination.

Several unsatisfactory attempts have been made to address this problem of allowing units of data from an uplevel system to operate on a downlevel system. Many computers, such as the IBM System/38, simply forbid a downlevel computer system to restore a unit of data from an uplevel computer system. Other computers allow a downlevel computer system to restore a unit of data from an uplevel system without performing any verification of compatibility with the previous release. This approach is quite undesirable and risky, since many "restored" units of data will not work properly on the downlevel system and may destroy other data or cause the downlevel system to cease operating altogether.

Another attempt to address the problem of allowing units of data from an uplevel system to operate on a downlevel system requires that information about changes from release N−1 to release N be placed on the release N−1 system, effectively giving the release N−1 system the ability, to see into the future so it can perform a restore operation on a unit of data from a release N system. This attempt is undesirable since it requires a modification to each downlevel system whenever a new release is issued. This creates precisely the same problem that it attempts to solve— requiring simultaneous modifications of all downlevel systems.

SUMMARY OF THE INVENTION

It is a primary object of the invention to allow for the moving of data between computers operating at different releases in a distributed computing system.

It is another object of the invention to allow a unit of data from a release N level computer to operate on a release N−M level computer.

It is another object of the invention to allow an unit of data from a release N level computer to operate on a release N−M level computer without requiring any modifications to be made to the release N−M level computer.

These and other objects are accomplished by the computer system with downward compatibility function disclosed herein.

A method and apparatus is disclosed for moving a unit of data (such as an object, program, or file) from a computer operating at a current programming release or version level N to a computer operating at a previous release level N−M in a manner that assures that the unit of data will function predictably when restored to the previous release without having to make modifications or updates to the N−M level computer system. This invention allows a new release to be gradually phased in for a distributed computing system or installed on some computers and not others instead of requiring that all computers be upgraded to the new release before units of data can be moved between systems.

When a user desires to move a unit of data from a release N computer to a release N−M computer, the release of the N−M computer is specified during the "backup" or "save" operation. Given this information, in conjunction with information known to the release N computer about changes made from previous releases, the "backup" operation determines whether this unit of data is compatible with or can be converted for proper operation on the specified release N−M computer. Specifically, the "backup" operation analyzes specific fields in the unit of data that indicate if this unit of data is eligible for operation on the specified downlevel computer, whether new functions added between releases are compatible with or make conversion to the previous release possible, and if the structure of the unit of data is such that operation on the specified downlevel computer will be possible. If the backup operation determines that the unit of data is compatible with or can be converted for proper operation on the specified downlevel computer, a save descriptor block compatible with the downlevel release is added to the converted or compatible unit of data, thus making the unit of data appear like it was "backed-up" from a computer at the same level as the specified downlevel computer. This converted or compatible unit of data with save descriptor block is then sent to the specified downlevel computer, where a normal "restore" operation is performed. Since this unit of data with save descriptor block appears to the downlevel computer to have come from another downlevel computer, no modification of the downlevel computer is necessary.

DESCRIPTION OF THE PREFERRED EMBODIMENT

Figure 1:
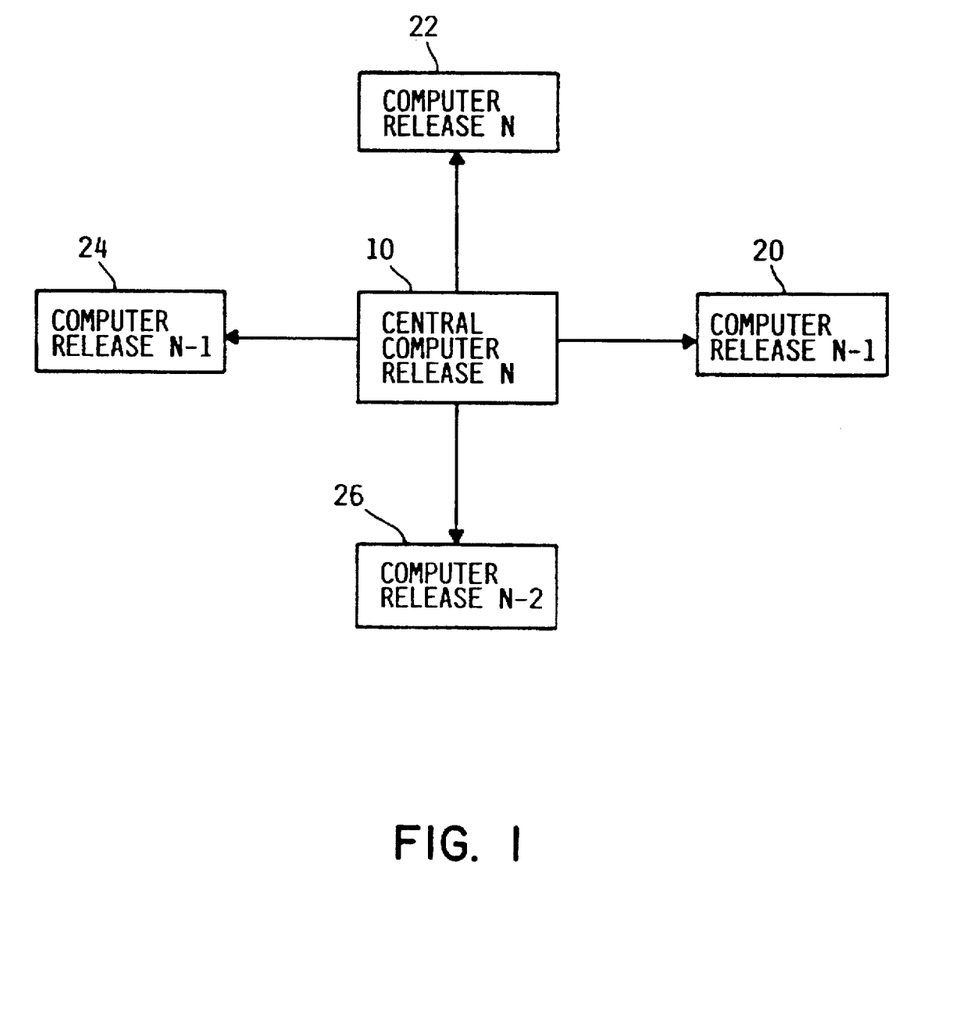
FIG. 1 shows an overall block diagram of a distributed computing system having computers operating at different release levels.

FIG. 1 shows an overall block diagram of a distributed computing system having computers operating at different release levels. Computer 10 is designated the "central computer" of the distributed computing system. In the preferred embodiment, computer 10 is an IBM Application System/400 Midrange Computer, although computer 10 could be a personal computer, a mainframe computer or any other type of computer and still fall within the scope of the invention. Computer 10 is operating at current release level N. In the preferred embodiment, computer 10 is considered to be operating at current release level N if the operating system on which computer 10 runs is at release level N. In the preferred embodiment, the operating system running in computer 10 is the IBM Operating System/400, although the operating system could be any other operating system, such as DOS or UNIX or VM and still fall within the scope of the invention. Some release levels for DOS are DOS 3.1, 3.0, 2.1, 2.0, etc. Thus it is noted that while "N" is usually thought to be an integer, it can take on non-integer values. Phrases such as "N-1" are meant to represent the level of program immediately prior to level "N".

Computer 10 could also be considered to be operating at release level N if an application program, such as Lotus 1-2-3 or dBase IV, is running in computer 10 at release level N.

Computer 10 is able to move units of data to other computers 20, 22, 24, and 26 in the distributed computing system. Computer 22 operates at current release level N. Computers 20 and 24 operate at release level N-1, and computer 26 operates at release level N-2. Computer 10 may be directly connected, remotely connected, or not connected at all to computers 20, 22, 24, 26 in the distributed computing system. If computer 10 is not connected to the other computers, data is shared between the computers by putting the data on an external media associated with one computer, such as diskette, tape, or optical disk, and physically moving the media to the other computer. The media can be hand carried over to the other computer if the other computer is in the next room or building, or mailed if the other computer is in a different city, state, or country.

For the purposes of the invention, any computer operating at the current release level N can be considered the central computer. For example, computer 22 is equally suitable to be the central computer as computer 10.

Figure 2:
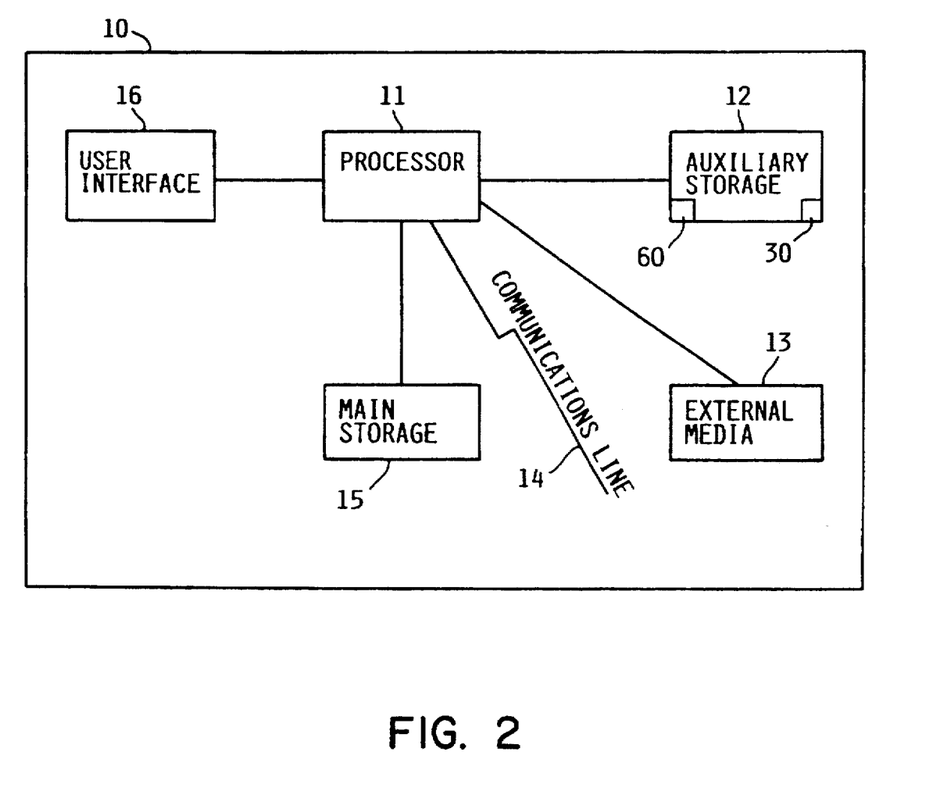
FIG. 2 shows a computer of the distributed computing system in more detail.

FIG. 2 shows computer 10 of the distributed computing system in more detail. Computer 10 has processor 11, suitably programmed as indicated in the flowcharts in FIG. 5 and FIG. 6, as will be explained later. Connected to processor 11 is auxiliary storage 12, external media 13, communications line 14, and main storage 15. The user communicates to computer 10 through user interface 16, which is also connected to processor 11. Auxiliary storage 12 is typically a magnetic hard disk or other direct access storage device. External media 13 can be magnetic tape, diskette, removable optical disk, or other type of transportable media. Communications line 14 can be directly connected to one computer or a network of other computers, or remotely attached to one or more computers via telephone lines. Main storage 15 is typically random access memory (RAM) or other memory available to processor 11 for its use. User interface 16 can be a personal computer or any other workstation that allows the user to communicate to computer 10.

Unit of data 30 is stored with several other units of data on auxiliary storage 12. In the preferred embodiment, unit of data 30 is called an object, although unit of data 30 could also be a program or other file.

Figure 3:
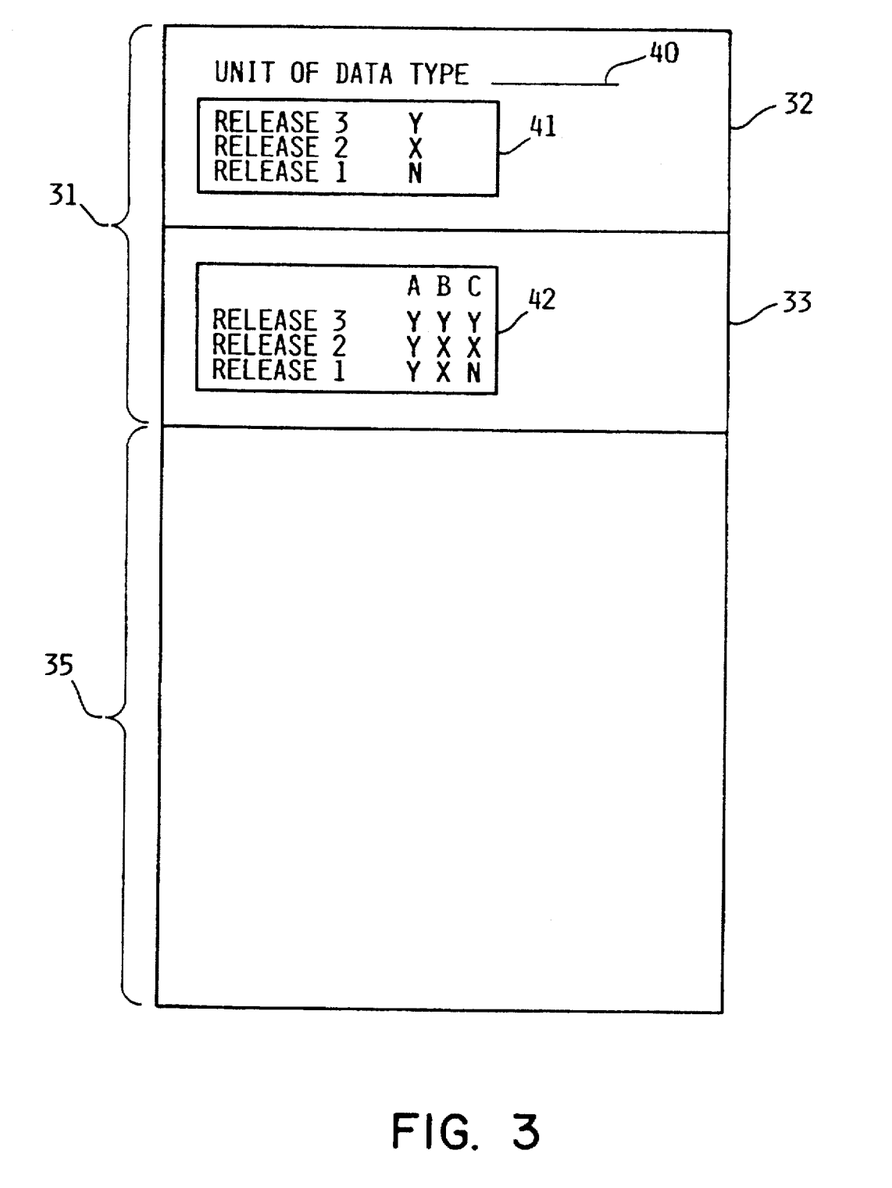
FIG. 3 shows a unit of data of the preferred embodiment in more detail.

FIG. 3 shows unit of data 30 of the preferred embodiment in more detail. Unit of data 30 contains header portion 31 and body portion 35. Header 31 contains common unit of data header 32 and unit of data specific header 33. Header 31 contains fields that contain specific information about unit of data 30. Body 35 contains data that is used in performing the function(s) of unit of data 30.

The fields contained in header 31 will now be explained in more detail. The fields in header 31 are set up when unit of data 30 is created. Field 42 contains an indication of which functions were present in each release. The executable code that performs these functions is contained in body 35 of unit of data 30. Field 41, which is a summary of field 42, indicates whether this unit of data can be moved to a computer operating at the same or a lower release level. If unit of data 30 is a type that is inappropriate to ever be moved (such as a copy protected program), all indicators in field 41 would be answered N. The unit of data type is specified in field 40.

For the purpose of this discussion let us assume that computer 10 is operating at release level 3 (N=3) and unit of data 30 contains functions A, B, and C. Function A is available in releases 3, 2, and 1. Function B is available in release 3, and must be converted prior to running in releases 2 and 1. Function C is available in release 3, must be converted prior to running in release 2, and is not available in release 1. As shown in field 42 of FIG. 3, this information is denoted by Y, X, and N. Y means the function is available in that release, X means that the function must be converted prior to running in that release and N means that the function is not available in that release. A summary of this information is stored in field 41. The release 3 indicator is Y since all the functions are available in release 3. The release 2 indicator is X since all the functions are either available or must be converted prior to running in release 2. And the release 1 indicator is N since at least one of the functions (function C) is not available in release 1. Therefore, unit of data 30 can be moved to a release 3 level computer (such as computer 22); unit of data 30 must be converted prior to being moved to a release 2 level computer (such as computer 20 or 24); unit of data 30 cannot be moved to a release 1 level computer (such as computer 26).

Figure 4:
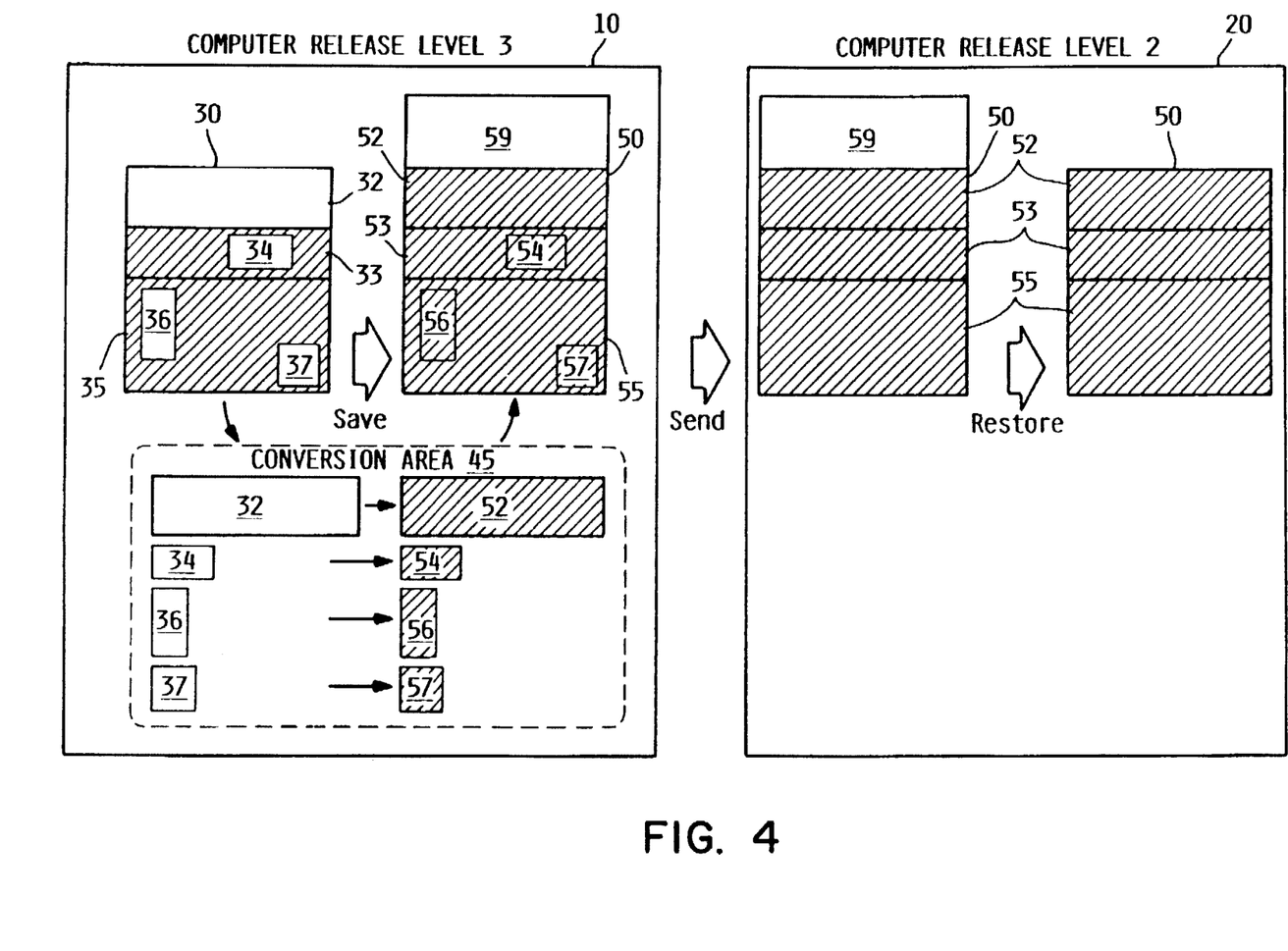
FIG. 4 shows how a unit of data of the preferred embodiment is moved from a release N computer system to a release N-1 computer system.

FIG. 4 shows how unit of data 30 is moved from computer 10 operating at release level 3 to computer 20 operating at release level 2. The user via user interface 16 (FIG. 2) indicates that he wishes to "backup" (or "save" or "move" or "copy") unit of data 30 for purposes of "restoring" it later on a computer operating at release level 2. This is done by entering a command such as the following from a prompt or menu:

SAVUOD uod_name device <TGTRLS (2)> where "SAVUOD" is a notation for "save unit of data" and "TGTRLS" is a notation for "target release". The parameter "uod name" specifies the name of the unit of data (or library of units of data) to be saved. In our example, the specific name of unit of data 30 would be used. The parameter "device" indicates where the "saved" object should be written: to external media 13 or to communications line 14, for example. TGTRLS is an optional parameter. If it is absent, it is assumed that the restore operation will be done on a computer operating at the current release level. The argument (2) after TGTRLS indicates that the restore operation will be done on release level 2. If the user wanted the object to be restored on a computer operating at release level 1, the argument (1) would have been used. Arguments such as (current) or (previous) could also be used, where (previous) would mean release N–1.

Figure 5A:
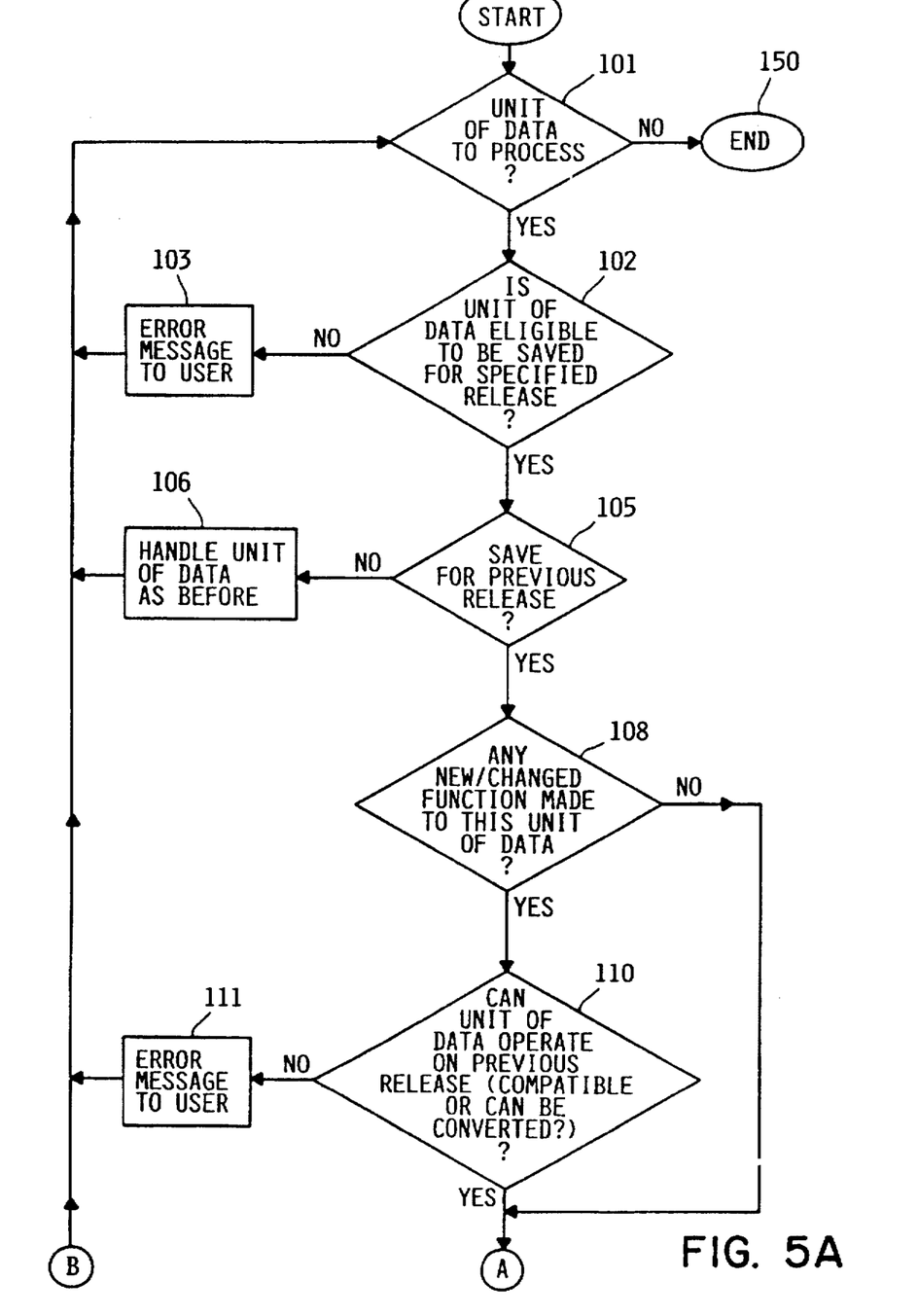
FIG. 5A-5B shows a flowchart of the operation of the computer of the invention.
Figure 6:
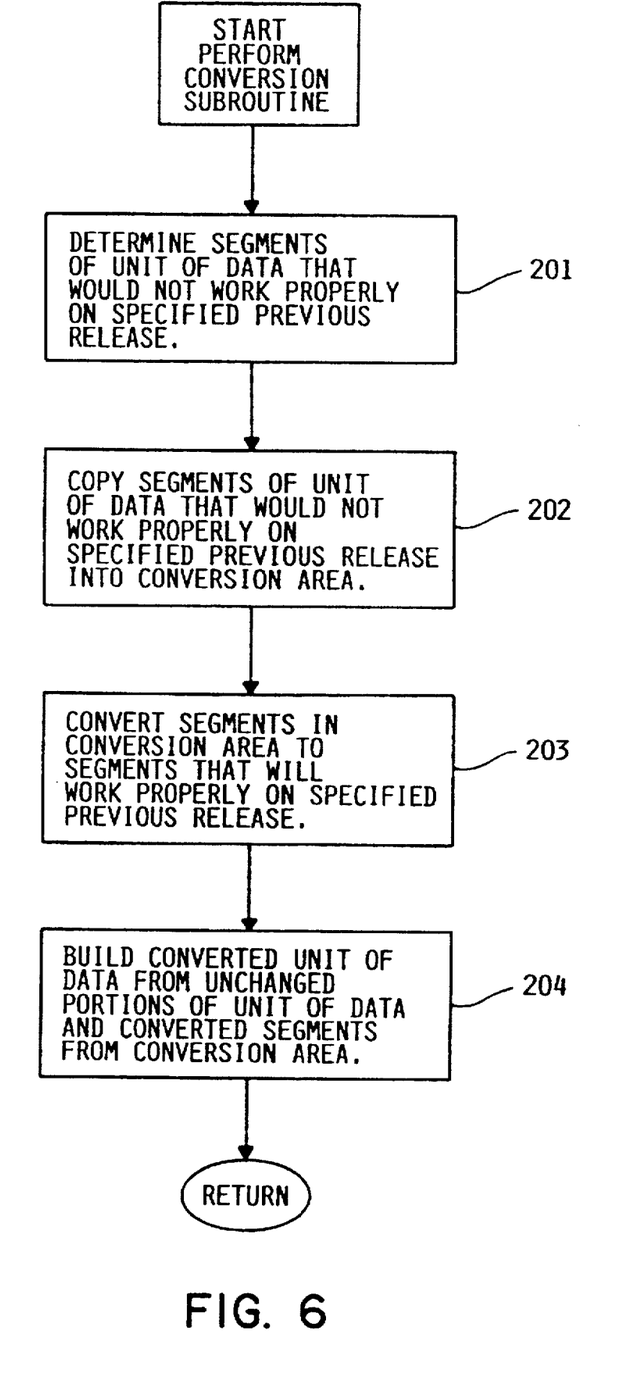
FIG. 6 shows a flowchart of the Perform Conversion subroutine of the invention.

The remainder of FIG. 4 will be discussed in conjunction with the flowcharts of FIG. 5 and FIG. 6. Block 101 (FIG. 5A) checks to see if there is a unit of data to process. The SAVUOD command received from the user in our example indicated that unit of data 30 is to be processed, so block 101 is answered affirmatively. Block 102 checks to see if unit of data 30 is eligible to be saved for the specified release. This is done by checking the appropriate indicator in field 41 of unit of data 30 (FIG. 3). Here, block 102 checks to see if unit of data 30 is eligible to be saved for a release 2 system, and finds the appropriate indicator in field 41 to be a "X". A unit of data is eligible to be saved if the appropriate indicator is either a "Y" or an "X". Therefore, block 102 is answered affirmatively and flow of control continues to block 105. If the appropriate indicator was "N", block 103 would post an error message to the user indicating that unit of data 30 cannot be saved for a release 2 system, and the program would loop back to block 101 to see if there was another unit of data to process.

Block 105 checks to see if the unit of data is to be restored on a computer operating at a previous release level. If not, block 106 processes unit of data 30 in a normal manner and loops back to block 101. If so, block 108 checks to see if there are any new or changed functions in this unit of data from the specified previous release. This is done by looking at field 42 of unit of data 30. Field 42 indicates that this (release 3) unit of data 30 contains functions A, B, and C, and on release 2 function A was not new or changed, but functions B and C are new or were changed. Therefore, block 108 is answered yes. Block 110 asks if the unit of data can operate on (is compatible with or convertible to) the specified previous release level. Field 42 of unit of data 30 is again analyzed to answer this question. In our example, field 42 indicates that function A is compatible since it did not change from release 2 to release 3. Field 42 also indicates that Functions B and C are convertible (as indicated by "X" in field 42).

If block 110 determines that the unit of data is not compatible with or convertible to a release 2 unit of data, block 111 posts an error message to the user and flow of control returns back to block 101. In our example, block 110 determines that unit of data 30 can operate as a release 2 unit of data 50, flow of control continues to block 120 (FIG. 5B), where the data in the body portion of the unit of data is analyzed to see if it is structured such that the unit of data can operate at the specified previous release. Block 120 would be answered negatively if, for example, release 3 supported data in hexadecimal, floating point, or variable length character format and release 2 did not. Upon detection of a unsupported data structure, block 120 is answered negatively, block 121 posts an error message to the user and flow of control goes back to block 101. If block 120 is answered affirmatively (as is the case in our example), block 130 builds a save descriptor block for the specified previous release. In the preferred embodiment, this save descriptor block is appended to the beginning of the compatible or converted unit of data and is used by the "restore" operation. The save descriptor block provides information that tells the restore operation how to restore this particular unit of data. Note that if the procedures shown in FIG. 5 were performed by a "move" or "copy" operation instead of a "backup" or "save" operation, the save descriptor block would not be necessary.

Block 140 looks to see if the unit of data needs to be converted to operate properly at the specified release level. This determination is made based on the analysis made earlier in blocks 110 and 120. If so, block 145 calls the Perform Conversion Subroutine of FIG. 6. Block 201 (FIG. 6) determines which segments of the unit of data cannot operate properly on the specified release level. This is done by looking at the unit of data type specified in field 40 (FIG. 3) and checking change history table 60 for this particular unit of data type. Change history table 60 contains information indicating which segments need to be converted for each unit of data type and how the conversion should be performed, and is stored in auxiliary storage 12 (FIG. 2). The conversion operation is highly dependent on unit of data type, and can range from changing one bit in the segment to changing every bit in the segment. A typical conversion operation involves zeroing out a pointer to a function supported on the current release but not supported on the previous release. By zeroing out the pointer, the new function can never be called by a computer operating on the previous release, thereby guaranteeing correct operation. Change history table 60 for this typical conversion operation would have an entry identifying the segment of data containing the pointer and have a corresponding entry containing a converted segment with the pointer zeroed out. The converted segment would be read into conversion area 45 to build the converted unit of data.

Block 202 copies the segments that change table 60 indicates need to be converted into conversion area 45 (FIG. 4). As shown in FIG. 4, change history table 60 has indicated that segments 32, 34, 36, and 37 need to be converted in our example, and each of these segments was copied into conversion area 45. Block 203 converts the segments in the conversion area to segments that will work properly on the specified previous release. This is done by reading the converted segment from change history table 60.

In our example in FIG. 4, segment 36 needs to be converted to allow function B to operate properly on a release 2 computer. Segment 37 needs to be converted to allow function C to operate on a release 2 computer. The common unit of data header (segment 32) and a portion of the unit of data specific header (segment 34) also need to be converted. Segment 32 is converted to segment 52. Likewise, segments 34, 36, and 37 are converted to segments 54, 56, and 57.

Referring again to FIG. 6, block 204 builds the converted unit of data from unchanged portions of the original unit of data and converted segments from conversion area 45. In our example in FIG. 4, converted unit of data 50 is built by combining the unchanged portions of unit of data 30 (shown as shaded areas) with the converted segments of conversion area 45 (also shown as shaded areas). The subroutine returns in block 204 to block 146 of FIG. 5B.

Figure 5B:
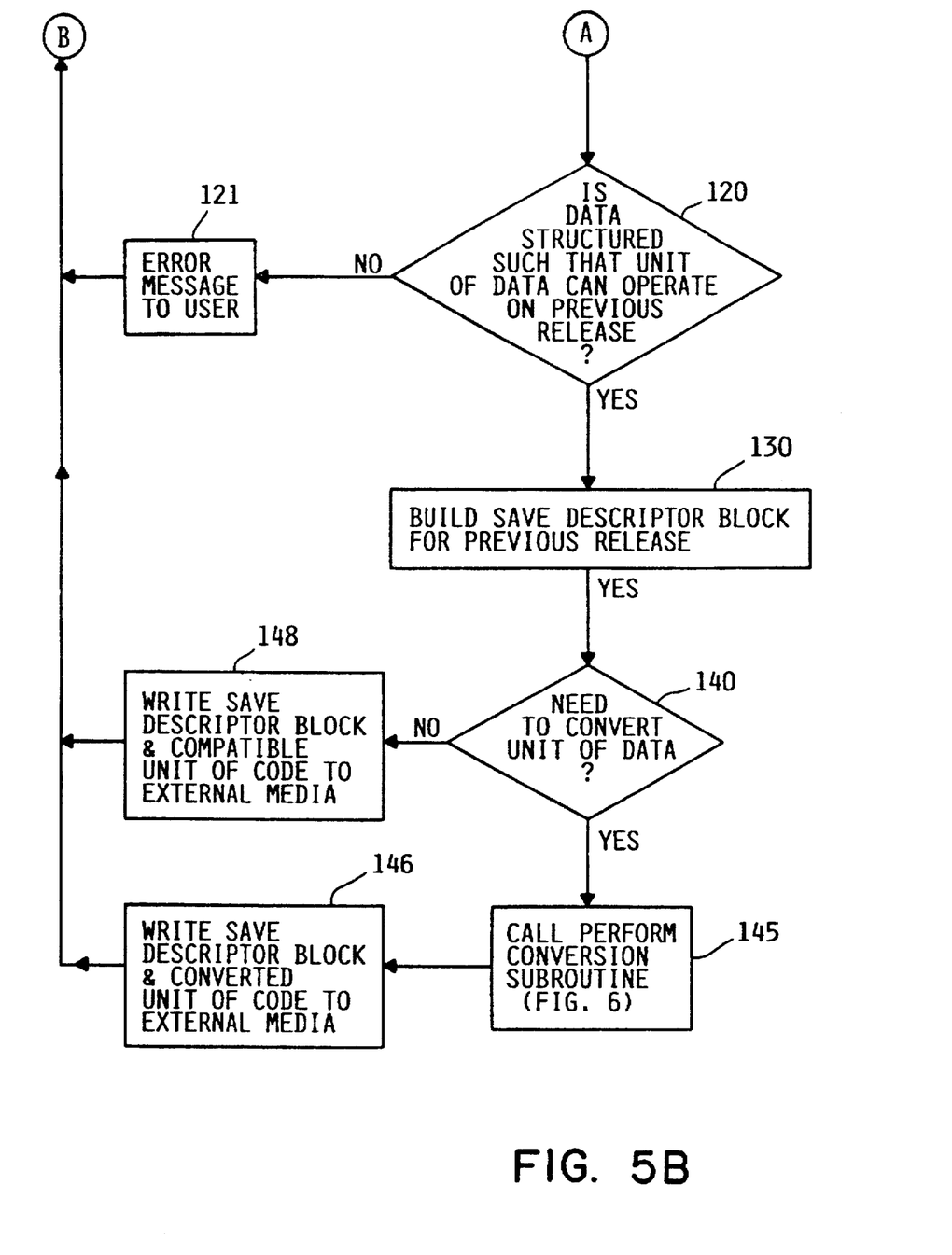

Block 146 writes the save descriptor block and the converted unit of data to external media 13 (FIG. 2). This save operation is shown pictorially in FIG. 4, where unit of data 30 (which operates on a release 3 level) has been saved as unit of data 50 (which operates on a release 2 level). Save descriptor block 59 is appended at the top of unit of data 50. After block 146 completes the write operation, flow of control returns to block 101.

If block 140 determines that no conversion is needed (unit of data is compatible with specified previous release), block 148 simply appends the save descriptor block to the top of the unit of data, and flow of control returns to block 101. When block 101 determines that there are no more units of data to process, the program ends in block 150.

Referring again to FIG. 4, unit of data 50 with save descriptor block 59 is sent to the specified release N–M computer system. In our example, the specified N–M computer system is computer 20 (FIG. 1) operating at release level 2. Computer 20 is very similar to computer 10 shown in FIG. 2. Unit of data 50 with save descriptor information 59 is sent either electronically via communication line 14 or by external media 13. As far as computer 20 is concerned, unit of data 50 with save descriptor information 59 looks like it was saved on a release 2 system. Therefore, computer 20 does not have to be modified to accept this unit of data with save descriptor information. Computer 20 performs a normal "restore" operation, using information in save descriptor block 59 to properly restore unit of data 50. Unit of data 50 is then stored on auxiliary storage 12 of computer 20 for future use. Note that if a "move" or "copy" operation created a unit of data 50, save descriptor block 59 would not be necessary and would not be sent to computer 20. Computer 20 would directly receive unit of data 50 into auxiliary storage 12 as part of the "move" or "copy" operation.

While this invention has been described with respect to the preferred embodiment, it will be understood by those skilled in the art that various changes in detail may be made therein without departing from the spirit, scope and teaching of the invention. For example, the invention could be performed by a conversion program instead of a save or backup command. Accordingly, the herein disclosed is to be limited only as specified in the following claims.

What is claimed is:

1. A method in a data processing system having multiple computers operating at diverse release levels for transferring a unit of data having an executable portion from a computer operating at release level N to a computer operating at a release level N–M, wherein M is greater than zero and less than N, said method comprising the data processing system implemented steps of:

designating a unit of data having an executable portion within a computer operating at release level N;

specifying an intent to transfer said designated unit of data having an executable portion from said computer operating at release level N to a computer operating at release level N–M;

automatically converting said executable portion of said unit of data from operation at said release level N to operation at said release level N–M in response to said specifying of said intent to transfer said designated unit of data; and thereafter transferring said converted designated unit of data to said computer operating at said release level N–M wherein said converted designated unit of data will execute properly within said computer operating at said release level N–M.

2. The method in a data processing system having multiple computers operating at diverse release levels for transferring a unit of data having an executable portion from a computer operating at release level N to a computer operating at release level N–M according to claim 1, wherein said unit of data having an executable portion includes a plurality of segments and wherein said step of automatically converting said executable portion of said unit of data from operation at said release level N to operation at said release level N–M in response to said specifying of said intent to transfer said designated unit of data comprises:

determining which of said plurality of segments of said unit of data will not operate at said release level N–M;

altering each of said segments of said unit of data which will not operate at said release level N–M so that each of said segments will operate at said release level N–M; and combining each altered segment of said unit of data with any unaltered segment of said unit of data to create a converted unit of data to create a converted unit of data which will operate at release level N–M.

3. The method in a data processing system having multiple computers operating at diverse release levels for transferring a unit of data having an executable portion from a computer operating at release level N to a computer operating at release level N–M according to claim 1, further including the step of adding a descriptor to said converted designated unit of data indicating that said converted designated unit of data will operate at said release level N–M.

4. The method in a data processing system having multiple computers operating at diverse release levels for transferring a unit of data having an executable portion from a computer operating at release level N to a computer operating at release level N–M according to claim 1, further including the step of transmitting an error message to a user in response to an inability of said system to automatically convert said executable portion of said unit of data from operation at said release level N to operation at said release level N–M in response to said specifying of said intent to transfer said designated unit of data.

5. A data processing system having multiple computers operating at diverse release levels for transferring a unit of data having an executable portion from a computer operating at release level N to a computer operating at a release level N–M, wherein M is greater than zero and less than N, said data processing system comprising:

means for permitting a user to designate a unit of data having an executable portion within a computer operating at release level N;

means for permitting a user to specify an intent to transfer said designated unit of data having an executable portion from said computer operating at release level N to a computer operating at release level N–M;

means for automatically converting said executable portion of said unit of data from operation at said release level N to operation at said release level N–M in response to said specifying of said intent to transfer said designated unit of data; and means for transferring said converted designated unit of data to said computer operating at release level N–M wherein said converted designated unit of data will execute properly within said computer operating at said release level M minus M.

6. The data processing system having multiple computers operating at diverse release levels for transferring a unit of data having an executable portion from a computer operating at release level N to a computer operating at release level N–M according to claim 5, wherein said unit of data having an executable portion includes a plurality of segments and wherein said means for automatically converting said executable portion of said unit of data from operation at said release level N to operation at said release level N–M in response to said specifying of said intent to transfer said designated unit of data comprises:

means from determining which of said plurality of segments of said unit of data will not operate at said release level N–M;

means for altering each of said segments of said unit of data which will not operate at said release level N–M so that each segments will operate at release level N–M; and means for combining each altered segment of said unit of data with any unaltered segment of said unit of data to create a converted unit of data which will operate at release level N–M.

7. The a data processing system having multiple computers operating at diverse release levels for transferring a unit of data having an executable portion from a computer operating at release level N to a computer operating at release level N–M according to claim 5, further including means for adding a descriptor to said converted designated unit of data indicating that said converted designated unit of data will operate at said release level N–M.

8. The data processing system having multiple computers operating at diverse release levels for transferring a unit of data having an executable portion from a computer operating at release level N to a computer operating at release level N–M according to claim 5, further including means for transmitting an error message to a user in response to an inability of said system to automatically convert said executable portion of said unit of data from operation at said release level N to operation at release level N–M in response to said specifying of said intent to transfer said designated unit of data.

9. The data processing system having multiple computers operating at diverse release levels for transferring a unit of data having an executable portion from a computer operating at release level N to a computer operating at release level N–M according to claim 5, wherein said unit of data comprises a program.

10. The data processing system having multiple computers operating at diverse release levels for transferring a unit of data having an executable portion from a computer operating at release level N to a computer operating at release level N–M according to claim 5, wherein said means for transferring said converted designated unit of data to said computer operating at said release level N–M comprises a communications line coupling said computer operating at release level N to said computer operating at said release level N–M.

11. The data processing system having multiple computers operating at diverse release levels for transferring a unit of data having an executable portion from a computer operating at release level N to a computer operating at release level N–M according to claim 6, wherein said unit of data includes a first field comprising information indicating whether or not a segment may be converted from operation at said release level N to operation at said release level N–M.

* * * * *